(12) United States Patent
Kajouke et al.

(10) Patent No.: US 8,860,379 B2
(45) Date of Patent: Oct. 14, 2014

(54) DISCHARGING A DC BUS CAPACITOR OF AN ELECTRICAL CONVERTER SYSTEM

(75) Inventors: Lateef A. Kajouke, San Pedro, CA (US); Milun Perisic, Torrance, CA (US); Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 847 days.

(21) Appl. No.: 13/090,911

(22) Filed: Apr. 20, 2011

(65) Prior Publication Data

US 2012/0268078 A1 Oct. 25, 2012

(51) Int. Cl.
| | |
|---|---|
| H02J 7/00 | (2006.01) |
| H02H 7/122 | (2006.01) |
| H02M 3/24 | (2006.01) |
| H02M 7/44 | (2006.01) |
| H02M 7/5387 | (2007.01) |

(52) U.S. Cl.
USPC ........... 320/166; 363/56.02; 363/98; 363/132

(58) Field of Classification Search
USPC .......................... 320/166; 363/56.02, 98, 132
See application file for complete search history.

(56) References Cited

U.S. PATENT DOCUMENTS

| | | | |
|---|---|---|---|
| 4,213,173 A | 7/1980 | Link et al. | |
| 4,669,036 A | 5/1987 | Cowett, Jr. | |
| 5,159,539 A | 10/1992 | Koyama | |
| 5,189,603 A | 2/1993 | Sashida et al. | |
| 5,274,538 A | 12/1993 | Sashida et al. | |
| 5,283,726 A | * 2/1994 | Wilkerson | 363/132 |
| 5,285,365 A | 2/1994 | Yamato et al. | |
| 5,418,707 A | * 5/1995 | Shimer et al. | 363/132 |
| 5,461,297 A | 10/1995 | Crawford | |
| 5,545,971 A | 8/1996 | Gomez et al. | |
| 5,949,659 A | 9/1999 | Lesche | |
| 6,034,513 A | 3/2000 | Farrington et al. | |

(Continued)

FOREIGN PATENT DOCUMENTS

| | | |
|---|---|---|
| CN | 2710247 Y | 7/2005 |
| CN | 1946587 A | 4/2007 |

(Continued)

OTHER PUBLICATIONS

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

(Continued)

Primary Examiner — Jue Zhang
(74) Attorney, Agent, or Firm — Ingassia Fisher & Lorenz, P.C.

(57) ABSTRACT

A system and method of discharging a bus capacitor of a bidirectional matrix converter of a vehicle are presented here. The method begins by electrically shorting the AC interface of the converter after an AC energy source is disconnected from the AC interface. The method continues by arranging a plurality of switching elements of a second energy conversion module into a discharge configuration to establish an electrical current path from a first terminal of an isolation module, through an inductive element, and to a second terminal of the isolation module. The method also modulates a plurality of switching elements of a first energy conversion module, while maintaining the discharge configuration of the second energy conversion module, to at least partially discharge a DC bus capacitor.

20 Claims, 5 Drawing Sheets

(56) References Cited

U.S. PATENT DOCUMENTS

| | | | |
|---|---|---|---|
| 6,147,886 A | 11/2000 | Wittenbreder | |
| 6,351,397 B1 | 2/2002 | Sawa et al. | |
| 6,496,343 B2 | 12/2002 | Mahlein et al. | |
| 6,538,909 B2 | 3/2003 | Goodarzi et al. | |
| 6,566,764 B2 | 5/2003 | Rebsdorf et al. | |
| 6,583,519 B2 | 6/2003 | Aberle et al. | |
| 6,614,132 B2 | 9/2003 | Hockney et al. | |
| 6,989,613 B2 | 1/2006 | Andrews et al. | |
| 6,998,732 B2 | 2/2006 | Xing et al. | |
| 7,317,625 B2 | 1/2008 | Zhang et al. | |
| 7,330,363 B2 | 2/2008 | Ponnaluri et al. | |
| 7,483,282 B2 | 1/2009 | Kajouke et al. | |
| 7,492,221 B2 | 2/2009 | Lawson et al. | |
| 7,525,296 B2 | 4/2009 | Billig et al. | |
| 7,558,087 B2 | 7/2009 | Meysenc et al. | |
| 7,599,204 B2 | 10/2009 | Kajouke et al. | |
| 7,679,941 B2 | 3/2010 | Raju et al. | |
| 7,764,527 B2 | 7/2010 | Takayanagi | |
| 8,063,606 B2 | 11/2011 | Veselic | |
| 8,199,545 B2 | 6/2012 | Nguyen et al. | |
| 8,288,887 B2 | 10/2012 | Ransom et al. | |
| 8,614,901 B2* | 12/2013 | Victor et al. | 363/17 |
| 8,644,037 B2* | 2/2014 | Raju et al. | 363/37 |
| 2001/0012207 A1 | 8/2001 | Nomura | |
| 2001/0026427 A1 | 10/2001 | Mahlein et al. | |
| 2001/0036086 A1 | 11/2001 | Pascu et al. | |
| 2002/0044468 A1 | 4/2002 | Goodarzi et al. | |
| 2002/0109406 A1 | 8/2002 | Aberle et al. | |
| 2002/0176261 A1 | 11/2002 | Norrga | |
| 2003/0102718 A1 | 6/2003 | Hockney et al. | |
| 2004/0026929 A1 | 2/2004 | Rebsdorf et al. | |
| 2004/0041543 A1 | 3/2004 | Brooks et al. | |
| 2004/0066663 A1 | 4/2004 | Raichle | |
| 2004/0119449 A1 | 6/2004 | Matley | |
| 2004/0252532 A1 | 12/2004 | Lee et al. | |
| 2004/0257271 A1 | 12/2004 | Jacobson et al. | |
| 2005/0206343 A1 | 9/2005 | Ichinose et al. | |
| 2005/0270813 A1 | 12/2005 | Zhang et al. | |
| 2006/0133120 A1 | 6/2006 | Sato et al. | |
| 2006/0176028 A1* | 8/2006 | Schulte et al. | 320/166 |
| 2007/0035265 A1 | 2/2007 | Balog, Jr. et al. | |
| 2007/0139975 A1 | 6/2007 | Yamauchi et al. | |
| 2007/0274109 A1 | 11/2007 | Oyobe et al. | |
| 2008/0013351 A1 | 1/2008 | Alexander | |
| 2008/0055938 A1 | 3/2008 | Kajouke et al. | |
| 2008/0055954 A1 | 3/2008 | Kajouke et al. | |
| 2008/0122422 A1 | 5/2008 | Zhang et al. | |
| 2008/0130339 A1 | 6/2008 | McDonald et al. | |
| 2008/0198632 A1 | 8/2008 | Takayanagi | |
| 2009/0033393 A1 | 2/2009 | Park et al. | |
| 2009/0059633 A1 | 3/2009 | Hara et al. | |
| 2009/0189456 A1 | 7/2009 | Skutt | |
| 2009/0251938 A1 | 10/2009 | Hallak | |
| 2009/0322287 A1 | 12/2009 | Ozeki et al. | |
| 2010/0103703 A1 | 4/2010 | Nishiyama et al. | |
| 2010/0128503 A1 | 5/2010 | Liu et al. | |
| 2010/0244773 A1 | 9/2010 | Kajouke | |
| 2010/0244775 A1* | 9/2010 | Smith | 363/132 |
| 2010/0259218 A1 | 10/2010 | Gale et al. | |
| 2011/0031927 A1 | 2/2011 | Kajouke et al. | |
| 2011/0031930 A1 | 2/2011 | Kajouke | |
| 2011/0032732 A1 | 2/2011 | Hsu | |
| 2011/0080151 A1 | 4/2011 | Rahardjo et al. | |
| 2011/0089928 A1 | 4/2011 | O'Gorman et al. | |
| 2011/0227407 A1* | 9/2011 | Ransom | 363/132 |
| 2012/0014140 A1 | 1/2012 | Kajouke et al. | |
| 2012/0112549 A1 | 5/2012 | Perisic et al. | |
| 2012/0113683 A1 | 5/2012 | Perisic et al. | |
| 2012/0113700 A1 | 5/2012 | Kajouke et al. | |

FOREIGN PATENT DOCUMENTS

| | | |
|---|---|---|
| CN | 101022970 A | 8/2007 |
| CN | 101136594 A | 3/2008 |
| CN | 101136596 A | 3/2008 |
| CN | 101150281 A | 3/2008 |
| CN | 101166001 A | 4/2008 |
| CN | 101217255 A | 7/2008 |
| CN | 100410742 C | 8/2008 |
| CN | 101263648 A | 9/2008 |
| CN | 101465609 A | 6/2009 |
| CN | 101675580 A | 3/2010 |
| CN | 101847888 A | 9/2010 |
| CN | 101997323 A | 3/2011 |
| CN | 102029926 A | 4/2011 |
| DE | 102007040550 A1 | 3/2008 |
| GB | 2459542 A | 11/2009 |
| JP | 2008306855 A | 12/2008 |
| WO | 200191279 A1 | 11/2001 |

OTHER PUBLICATIONS

USPTO, U.S. Final Office Action mailed Jun. 28, 2012, for U.S. Appl. No. 12/535,994, filed Aug. 5, 2008.
USPTO, U.S. Final Office Action mailed May 10, 2012, for U.S. Appl. No. 12/413,181, filed Mar. 27, 2009.
USPTO, U.S. Notice of Allowance mailed Jun. 11, 2012, for U.S. Appl. No. 12/622,088, filed Nov. 19, 2009.
Office Action, dated Oct. 24, 2012, for U.S. Appl. No. 12/941,552.
Office Action, dated Nov. 9, 2012, for U.S. Appl. No. 12/949,439.
Notice of Allowance, dated Nov. 15, 2012, for U.S. Appl. No. 12/725,265.
Notice of Allowance, dated Nov. 16, 2012, for U.S. Appl. No. 12/535,975.
USPTO Notice of Allowance mailed Jan. 25, 2013; U.S. Appl. No. 12/839,134, filed Jul. 19, 2010.
U.S. Office Action, dated Nov. 25, 2011, for U.S. Appl. No. 12/622,088.
U.S. Office Action, dated Jan. 23, 2012, for U.S. Appl. No. 12/535,994.
Ransom, Ray., et al. "Systems and Methods for Initializing a Charging System," U.S. Appl. No. 13/149,484, filed May 31, 2011.
Kajouke, L.A., et al. "Systems and Methods for Reducing Harmonic Distortion in Electrical Converters", U.S. Appl. No. 12/941,488, filed Nov. 8, 2010.
U.S. Office Action, dated Feb. 8, 2012, for U.S. Appl. No. 12/535,975.
Perisic, M., et al. "Systems and Methods for Providing Power to a Load Based Upon a Control Strategy", U.S. Appl. No. 13/222,961, filed Aug. 31, 2011.
Perisic, M., et al. "Systems and Methods for Providing Power to a Load Based Upon a Control Strategy", U.S. Appl. No. 12/949,439, filed Nov. 18, 2010.
USPTO, Office Action in U.S. Appl. No. 12/941,488, mailed Mar. 20, 2013.
USPTO, Notice of Allowance and Fee(s) Due for U.S. Appl. No. 12/941,552, mailed Feb. 20, 2013.
USPTO, Notice of Allowance and Fee(s) Due for U.S. Appl. No. 12/535,994, mailed Sep. 7, 2012.
USPTO, Notice of Allowance and Fee(s) Due for U.S. Appl. No. 12/949,439, mailed Mar. 25, 2013.
U.S. Appl. No. 12/941,552, filed Nov. 8, 2010.
U.S. Appl. No. 12/941,488, filed Nov. 8, 2010.
Ransom, R.M., "Systems and Methods for Deactivating a Matrix Converter," U.S. Appl. No. 12/725,265, filed Mar. 16, 2010.
Kajouke, L.A., et al., "Systems and Methods for Reducing Transient Voltage Spikes in Matrix Converters," U.S. Appl. No. 12/839,134, filed Jul. 19, 2010.
Ransom R.M., et al. "Systems and Methods for Commutating Inductor Current Using a Matrix Converter," U.S. Appl. No. 12/622,088, filed Nov. 19, 2009.
Perisic, M., et al. "Systems and Methods for Providing Power to a Load Based Upon a Control Strategy," U.S. Appl. No. 12/949,439, filed Nov. 18, 2010.
Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

(56) References Cited

OTHER PUBLICATIONS

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

Perisic, M., et al "Compensation for Electrical Converter Nonlinearities," U.S. Appl. No. 12/941,521, filed Nov. 8, 2010.

Delorme, Gilles M., et al. "Methods and Systems for Controlling Vehicle Defrost Units," U.S. Appl. No. 12/871,664, filed Aug. 30, 2010.

State Intellectual Property Office of the People's Republic of China, Office Action for Chinese Patent Application No. 201210317459.5, mailed Apr. 23, 2014.

USPTO, Notice of Allowance and Fee(s) Due for U.S. Appl. No. 12/941,521, mailed Jul. 19, 2013.

USPTO, Notice of Allowance and Fee(s) Due for U.S. Appl. No. 12/941,488, mailed Jul. 31, 2013.

USPTO, Notice of Allowance and Fee(s) Due for U.S. Appl. No. 13/222,961, mailed Sep. 18, 2013.

USPTO, Notice of Allowance and Fee(s) Due for U.S. Appl. No. 13/149,484, mailed Jun. 26, 2013.

USPTO, Office Action for U.S. Appl. No. 12/413,181, mailed Aug. 15, 2013.

Office Action, dated Oct. 5, 2011, for U.S. Appl. No. 12/413,181.

Office Action, dated Jul. 23, 2012, for U.S. Appl. No. 12/725,265.

Final Office Action, dated Aug. 2, 2012, for U.S. Appl. No. 12/535,975.

Office Action, dated Aug. 29, 2012, for U.S. Appl. No. 12/839,134.

USPTO, Notice of Allowance and Fee(s) Due for U.S. Appl. No. 13/149,484, mailed Oct. 11, 2013.

USPTO, Final Office Action for U.S. Appl. No. 12/413,181, mailed Mar. 13, 2014.

\* cited by examiner

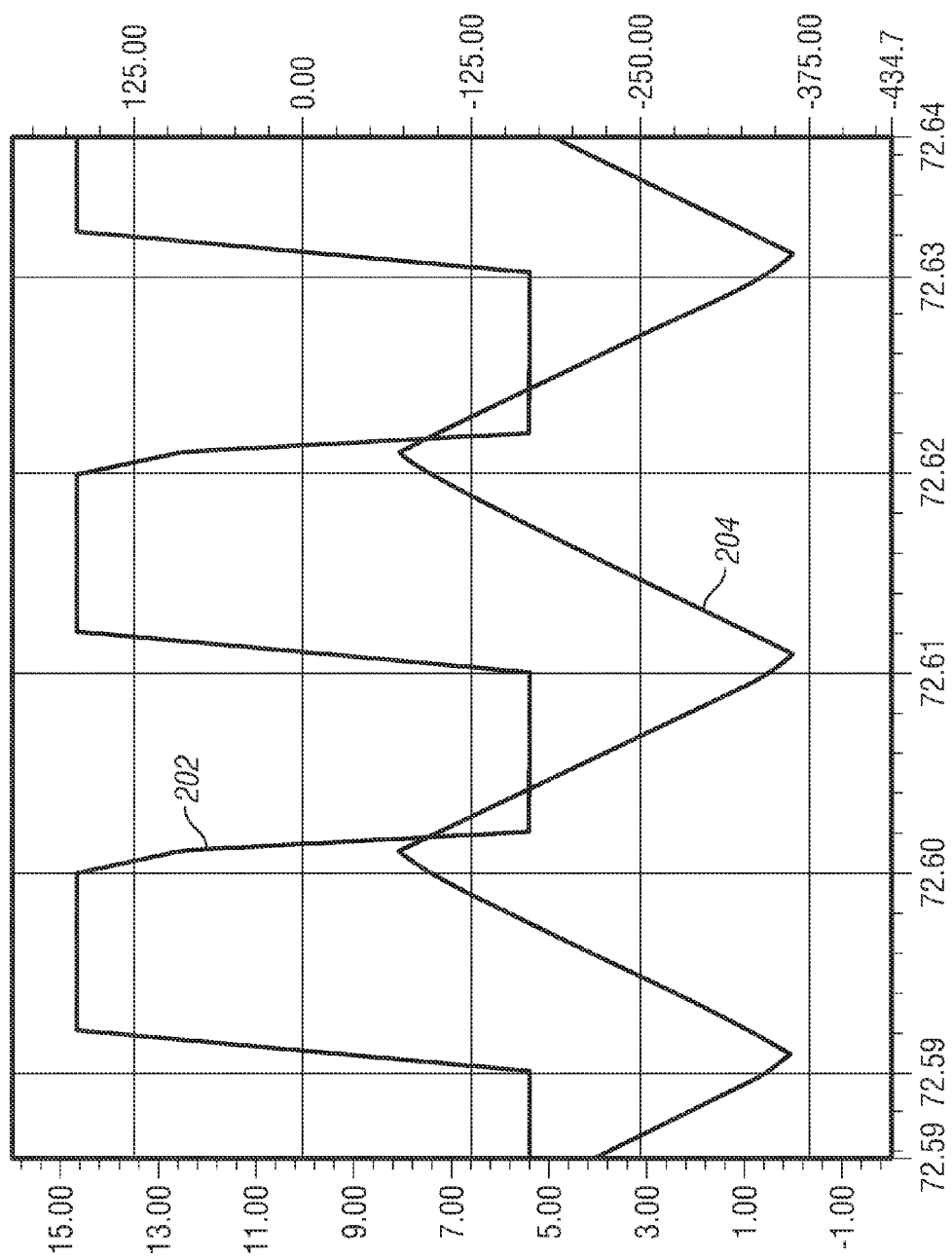

DISCHARGING A DC BUS CAPACITOR OF AN ELECTRICAL CONVERTER SYSTEM

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of contract number DE-FC26-07NT43123 awarded by the United States Department of Energy.

TECHNICAL FIELD

Embodiments of the subject matter described herein relate generally to electrical conversion systems in vehicles. More particularly, embodiments of the subject matter relate to discharging a bus capacitor of an electrical converter system of a vehicle.

BACKGROUND

Matrix converters may be used in electric and/or hybrid vehicles to accommodate delivery of relatively high power over a relatively wide range of operating voltages, while at the same time achieving galvanic isolation, relatively high power factors, low harmonic distortion, relatively high power density and low cost. For example, bidirectional isolated matrix converters may be used to deliver energy from an alternating current (AC) energy source, such as the single-phase grid electricity common in most residential and commercial buildings, to charge a direct current (DC) energy storage element, such as a high voltage rechargeable battery, in a vehicle.

A bidirectional matrix converter includes a high voltage DC bus capacitor that is coupled across the AC input interface. Under certain conditions, it is desirable to discharge the voltage across the DC bus capacitor. For example, if the high voltage DC energy source (battery) is disconnected from the AC input interface or if the bidirectional matrix converter is removed from the vehicle, the DC bus capacitor should be discharged to a safe voltage level.

BRIEF SUMMARY

An exemplary embodiment of an electrical system includes a direct current (DC) interface, an alternating current (AC) interface, a DC bus capacitor coupled electrically parallel to the DC interface, a first energy conversion module comprising a plurality of switching elements, a second energy conversion module comprising a plurality of switching elements, and an isolation module coupled between the first energy conversion module and the second energy conversion module to provide galvanic isolation between the first energy conversion module and the second energy conversion module. The electrical system also includes an inductive element coupled between the second energy conversion module and the AC interface, an interface shorting switch coupled electrically parallel to the AC interface to selectively short the AC interface, and a control module coupled to the first energy conversion module, the second energy conversion module, and the interface shorting switch. The control module is configured to detect a condition indicative of a need to discharge the DC bus capacitor, actuate the interface shorting switch to electrically short the AC interface, and operate the plurality of switching elements of the first energy conversion module and the plurality of switching elements of the second energy conversion module to at least partially discharge the DC bus capacitor. In practice, the AC interface is shorted after disconnecting the AC power source from the AC interface.

An exemplary embodiment of a method of operating an electrical system is also provided. The electrical system includes a DC interface, an AC interface, a DC bus capacitor coupled electrically parallel to the DC interface, a first energy conversion module comprising a plurality of switching elements, a second energy conversion module comprising a plurality of switching elements, an isolation module coupled between the first energy conversion module and the second energy conversion module to provide galvanic isolation between the first energy conversion module and the second energy conversion module, and an inductive element coupled between the second energy conversion module and the AC interface. The method involves detecting a condition indicative of a need to discharge the DC bus capacitor, electrically shorting the AC interface, arranging the plurality of switching elements of the second energy conversion module into a discharge configuration to establish an electrical current path from a first terminal of the isolation module, through the inductive element, and to a second terminal of the isolation module, and modulating one or more of the plurality of switching elements of the first energy conversion module to alternately charge and discharge current in the inductive element, while maintaining the discharge configuration of the plurality of switching elements of the second energy conversion module. In practice, the AC interface is shorted after disconnecting the AC power source from the AC interface.

Also provided is an exemplary embodiment of a method of discharging a bus capacitor of a bidirectional matrix converter of a vehicle having a DC energy source. The bidirectional matrix converter includes a DC interface for the DC energy source, an AC interface for an AC energy source to charge the DC energy source via the bidirectional matrix converter, a first energy conversion module, a second energy conversion module, an isolation module coupled between the first energy conversion module and the second energy conversion module, and an inductive element coupled between the second energy conversion module and the AC interface. The method involves electrically shorting the AC interface after the AC energy source is disconnected from the AC interface, arranging a plurality of switching elements of the second energy conversion module into a discharge configuration to establish an electrical current path from a first terminal of the isolation module, through the inductive element, and to a second terminal of the isolation module, and modulating a plurality of switching elements of the first energy conversion module, while maintaining the discharge configuration of the second energy conversion module, to at least partially discharge the DC bus capacitor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a graph that includes representative plots of inductor voltage and current for the inductance element in the electrical system shown in FIG. 1.

DETAILED DESCRIPTION

Figure 1:
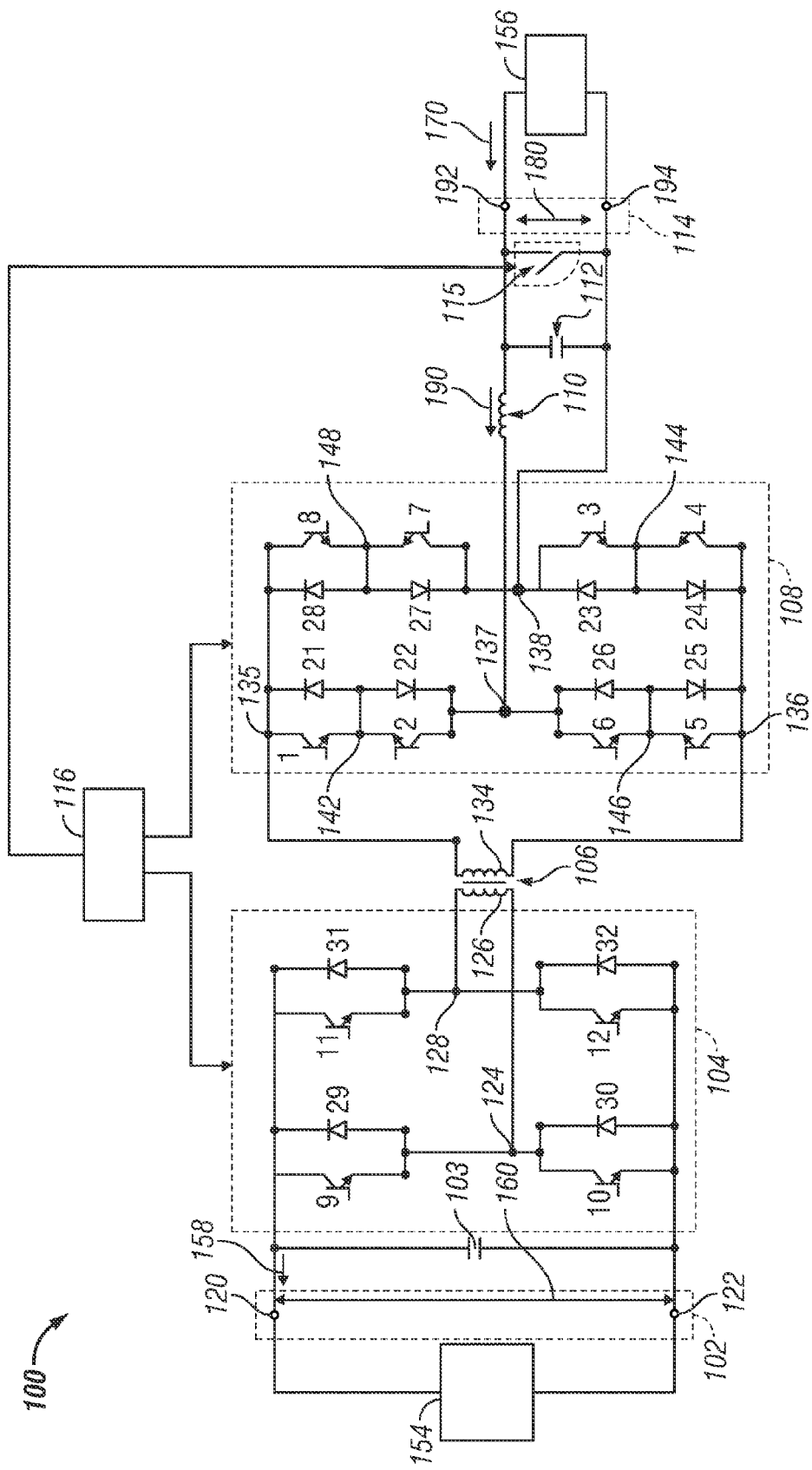
FIG. 1 is a schematic view of an electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Technologies and concepts discussed herein relate generally to electrical converters capable of delivering energy from an alternating current (AC) interface to a direct current (DC) interface, and vice versa, with low total harmonic distortion at the AC interface. As one example, a bidirectional matrix converter may be deployed in an electric or hybrid electric vehicle. In such an application, the bidirectional matrix converter facilitates charging of a high voltage DC energy source (such as a battery) using an AC energy source (such as a household power outlet). In some embodiments, the bidirectional matrix converter may be used to generate AC power from the high voltage DC energy source.

As described in more detail below, a bidirectional matrix converter includes a high voltage DC bus capacitor that becomes charged with the voltage present on the high voltage DC bus of the vehicle. In certain situations it is desirable to discharge the DC bus capacitor from a high voltage state (e.g., hundreds of volts) to a low voltage state that satisfies safety measures. For example, if the high voltage DC energy source is disconnected from the high voltage DC bus of the vehicle or if the bidirectional matrix converter is removed from the vehicle, then certain measures should be taken to ensure that the voltage across the DC bus capacitor is discharged to a safe level. The following detailed description presents an exemplary discharging technique for a DC bus capacitor in a bidirectional matrix converter. The system and technique described below do not require any additional hardware or an external discharge card or module. Moreover, the system and technique described below do not introduce any heat sink requirements for accommodating heat that might otherwise be generated using passive resistive discharging approaches. Instead, the methodology presented here leverages the existing circuit topology of the bidirectional matrix converter itself and modulates the switches in the bidirectional matrix converter in a way that discharges the high voltage DC bus capacitor while controlling the amount of current flow in accordance with the capacity of the switches and the desired thermal design parameters.

FIG. 1 depicts an exemplary embodiment of an electrical system 100 (or, alternatively, a bidirectional matrix converter, a charging system, a charger, a charging module, or the like) suitable for use in a vehicle, such as, without limitation, an electric automobile or a hybrid automobile. The electrical system 100 includes, without limitation: a first interface 102; a DC bus capacitor 103 coupled electrically parallel to the first interface 102; a first energy conversion module 104 having a plurality of switching elements; an isolation module 106; a second energy conversion module 108 having a plurality of switching elements; an inductive element 110; a capacitive element 112; a second interface 114; an interface shorting switch 115 coupled electrically parallel to the second interface 114 to selectively short the second interface as needed; and a control module 116. The inductive element 110 is coupled between the second energy conversion module 108 and the second interface 114, and the capacitive element 112 is coupled across the second interface 114. The control module 116 is operatively coupled to at least the first energy conversion module 104, the second energy conversion module 108, and the interface shorting switch 115. In certain embodiments, the control module 116 may be operatively coupled to one or more additional components, elements, or features of the electrical system 100 to support additional functionality that is not described in detail here.

The first interface 102 includes or corresponds to a node 120 and a node 122. As shown in FIG. 1, the DC bus capacitor 103 is connected across these nodes 120, 122. In other words, the DC bus capacitor 103 is coupled electrically parallel to the first interface 102. The first energy conversion module 104 includes a plurality of switching elements (labeled with reference numbers 9-12) coupled between these nodes 120, 122. In the illustrated embodiment, the first energy conversion module 104 comprises four switching elements, each having a diode (labeled with reference numbers 29-32) configured antiparallel to the respective switching element to accommodate bidirectional energy delivery. In an exemplary embodiment, the switching elements 9-12 are realized as transistors, and may be implemented using any suitable semiconductor transistor switch, such as a insulated gate bipolar transistor (IGBT), a field-effect transistor (e.g., a MOSFET or the like), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes.

In the illustrated embodiment, the switching element 9 is connected between the node 120 and a node 124, which corresponds to a terminal of a primary winding (or a set of windings) 126 of the isolation module 106, and the switching element 10 is connected between the node 124 and the node 122. Similarly, the switching element 11 is connected between the node 120 and a node 128, which corresponds to another terminal of the primary winding 126, and the switching element 12 is connected between the node 128 and the node 122. In operation, the switching element 9 is configured to provide a path for current flow from the node 120 to the node 124 when it is closed. Likewise, the switching element 10 provides a path for current flow from the node 124 to the node 122 when it is closed, the switching element 11 provides a path for current flow from the node 120 to the node 128 when it is closed, and the switching element 12 provides a path for current flow from the node 128 to the node 122 when it is closed.

The anode of the diode 29 is coupled to the node 124, and the cathode of the diode 29 is coupled to the node 120. For this particular embodiment, the diode 29 is connected between the node 124 and the node 120 to provide a path for current flow from the node 124 to the node 120 (e.g., the diode 29 is antiparallel to the switching element 9). Similarly, for the illustrated embodiment: the anode of the diode 30 is coupled to the node 122, and the cathode of the diode 30 is coupled to the node 124 to provide a path for current flow from the node 122 to the node 124; the anode of the diode 31 is coupled to the node 128, and the cathode of the diode 31 is coupled to the node 120 to provide a path for current flow from the node 128 to the node 120; and the anode of the diode 32 is coupled to the node 122, and the cathode of the diode 32 is coupled to the node 128 to provide a path for current flow from the node 122 to the node 128.

The second energy conversion module 108 is coupled to the terminals of a secondary winding (or a set of windings) 134 of the isolation module 106. In this regard, a terminal of the secondary winding 134 is coupled to (or corresponds to) a node 135, and another terminal of the secondary winding 134 is coupled to (or corresponds to) a node 136. Another node 137 of the second energy conversion module 108 is coupled to the inductive element 110, and yet another node 138 of the second energy conversion module 108 is coupled to the capacitive element 112.

The second energy conversion module 108 includes a plurality of switching elements (labeled with reference numbers 1-8) coupled between the nodes 135, 136. In the illustrated embodiment, the second energy conversion module 108 comprises eight switching elements, each having an associated diode (labeled with reference numbers 21-28) configured antiparallel to the respective switching element to accommodate bidirectional energy delivery. In an exemplary embodiment, the switching elements 1-8 are realized as transistors, and may be implemented using any suitable semiconductor transistor switch (as described above).

In the illustrated embodiment, the switching element 1 is connected between the node 135 and a node 142, the switching element 2 is connected between the node 142 and the node 137, the switching element 3 is connected between the node 138 and a node 144, and the switching element 4 is connected between the node 144 and the node 136. Moreover, the switching element 5 is connected between a node 146 and the node 136, the switching element 6 is connected between the node 137 and the node 146, the switching element 7 is connected between a node 148 and the node 138, and the switching element 8 is connected between the node 135 and the node 148. In operation, the switching element 1 is configured to provide a path for current flow from the node 135 to the node 142 when it is closed. Likewise, the switching element 2 provides a path for current flow from the node 137 to the node 142 when it is closed, the switching element 3 provides a path for current flow from the node 138 to the node 144 when it is closed, the switching element 4 provides a path for current flow from the node 136 to the node 144 when it is closed, the switching element 5 provides a path for current flow from the node 136 to the node 146 when it is closed, the switching element 6 provides a path for current flow from the node 137 to the node 146 when it is closed, the switching element 7 provides a path for current flow from the node 138 to the node 148 when it is closed, and the switching element 8 provides a path for current flow from the node 135 to the node 148 when it is closed.

For this particular embodiment: the anode of the diode 21 is coupled to the node 142, and the cathode of the diode 21 is coupled to the node 135 to provide a path for current flow from the node 142 to the node 135; the anode of the diode 22 is coupled to the node 142, and the cathode of the diode 22 is coupled to the node 137 to provide a path for current flow from the node 142 to the node 137; the anode of the diode 23 is coupled to the node 144, and the cathode of the diode 23 is coupled to the node 138 to provide a path for current flow from the node 144 to the node 138; and the anode of the diode 24 is coupled to the node 144, and the cathode of the diode 24 is coupled to the node 136 to provide a path for current flow from the node 144 to the node 136. Similarly: the anode of the diode 25 is coupled to the node 146, and the cathode of the diode 25 is coupled to the node 136 to provide a path for current flow from the node 146 to the node 136; the anode of the diode 26 is coupled to the node 146, and the cathode of the diode 26 is coupled to the node 137 to provide a path for current flow from the node 146 to the node 137; the anode of the diode 27 is coupled to the node 148, and the cathode of the diode 27 is coupled to the node 138 to provide a path for current flow from the node 148 to the node 138; and the anode of the diode 28 is coupled to the node 148, and the cathode of the diode 28 is coupled to the node 135 to provide a path for current flow from the node 148 to the node 135.

The first interface 102 generally represents the physical interface (e.g., terminals, connectors, and the like) for coupling the electrical system 100 to a DC energy source 154, and the second interface 114 generally represents the physical interface (e.g., terminals, connectors, and the like) for coupling the electrical system 100 to an AC energy source 156. Accordingly, for convenience, the first interface 102 may be referred to herein as the DC interface and the second interface 114 may be referred to herein as the AC interface. In an exemplary embodiment, the control module 116 is coupled to the energy conversion modules 104, 108 and operates the energy conversion modules 104, 108 to deliver energy between the AC energy source 156 and the DC energy source 154 as needed.

In an exemplary embodiment, the DC energy source 154 (or alternatively, the energy storage source or ESS) is capable of receiving a direct current (indicated by arrow 158) from the electrical system 100 at a particular DC voltage level (indicated by arrow 160). In accordance with one embodiment, the DC energy source 154 is realized as a rechargeable high-voltage battery pack having a nominal DC voltage range from about 200 to about 500 volts. In this regard, the DC energy source 154 may comprise the primary energy source for another electrical system and/or an electric motor in a vehicle. For example, the DC energy source 154 may be coupled to a power inverter that is configured to provide voltage and/or current to the electric motor, which, in turn, may engage a transmission to drive the vehicle in a conventional manner. In other embodiments, the DC energy source 154 may be realized as a battery, an ultracapacitor, or another suitable energy storage element.

The AC energy source 156 (or power source) provides an AC current (indicated by arrow 170) to the electrical system 100 at a particular AC voltage level (indicated by arrow 180) and may be realized as a main power supply or main electrical system for a building, residence, or another structure within an electric power grid (e.g., mains electricity or grid power). In accordance with one embodiment, the AC energy source 156 comprises a single-phase power supply, as is common to most residential structures, which varies depending on the geographic region. For example, in the United States, the AC energy source 156 may be realized as 120 Volts (RMS) or 240 Volts (RMS) at 60 Hz, while in other regions the AC energy source 156 may be realized as 110 Volts (RMS) or 220 Volts (RMS) at 50 Hz. In alternative embodiments, the AC energy source 156 may be realized as any AC energy source suitable for operation with the electrical system 100.

The DC interface 102 is coupled to the first energy conversion module 104, and the AC interface 114 is coupled to the second energy conversion module 108 via the inductive element 110. The isolation module 106 is coupled between the energy conversion modules 104, 108 to provide galvanic isolation between the two energy conversion modules 104, 108. The control module 116 is coupled to the energy conversion modules 104, 108 and operates the second energy conversion module 108 to convert energy from the AC energy source 156 to high-frequency energy across the isolation module 106 which is then converted to DC energy at the DC interface 102 by the energy conversion module 104. The control module 116 may also be used to operate the energy conversion modules 104, 108 to support vehicle-to-grid applications (e.g., the DC energy source 154 delivering energy to the AC interface 114 and/or AC energy source 156). Moreover, the control module 116 operates the energy conversion modules 104, 108 in an appropriate manner to discharge the DC bus capacitor 103 when needed.

The antiparallel diodes are connected across each switching element to provide a path for current to the DC energy source 154 for charging the DC energy source 154 when the respective switching element is off. In order to deliver energy to (or charge) the DC energy source 154, the first energy conversion module 104 converts the high-frequency energy at the nodes 124, 128 to DC energy that is provided to the DC energy source 154 at the DC interface 102. In this regard, the first energy conversion module 104 operates as a rectifier when converting high frequency AC energy to DC energy. As shown, the DC bus capacitor 103 is configured electrically in parallel across the DC interface 102 to reduce voltage ripple at the DC interface 102, as will be appreciated in the art.

In an exemplary embodiment, the second energy conversion module 108 facilitates the flow of current (or energy) from the AC energy source 156 and/or the inductive element 110 to the isolation module 106 (and vice versa). In the illustrated embodiment, the second energy conversion module 108 is realized as a front end single-phase matrix conversion module comprising the eight switching elements and the eight diodes. During normal operation, the control module 116 modulates (e.g., opens and/or closes) the switching elements 1-8 in accordance with a PWM duty cycle control value to produce a high-frequency voltage at the nodes 135, 136 that results in a power flow to the DC interface 102 and/or DC energy source 154 intended to achieve a desired output voltage at the DC interface 102. In this regard, the control module 116 may operate the various switching elements as needed to establish voltage across the primary winding 126 for a controlled, preset, or otherwise designated period of time, and to facilitate charging of the DC bus capacitor 103 for a controlled, preset, or otherwise designated period of time. In practice, the duration of time for establishing the voltage across the primary winding 126 is equal to the duration of time for charging the DC bus capacitor 103 with the primary winding 126.

In the illustrated embodiment of FIG. 1, a first pair of switching elements 1, 2 and diodes 21, 22 are coupled between the node 137 and the node 135, with the combination of the switching element 1 and the diode 21 being configured with opposite polarity to the combination of the switching element 2 and the diode 22. In this manner, the switching element 1 and the diode 22 provide a path for current flow from the node 135 to the node 137 when the switching element 1 is closed and the voltage at the node 135 is more positive than the voltage at the node 137. The switching element 2 and the diode 21 are arranged to provide a path for current flow from the node 137 to the node 135 when the switching element 2 is closed and the voltage at the node 137 is more positive than the voltage at the node 135.

In a similar manner, a second pair of switching elements 3, 4 and diodes 23, 24 are coupled between the node 136 and the node 138, a third pair of switching elements 5, 6 and diodes 25, 26 are coupled between the node 137 and the node 136, and a fourth pair of switching elements 7, 8 and diodes 27, 28 are coupled between the node 135 and the node 138. The current flow behavior of these switching elements and diodes follows the principles outlined above for the first pair of switching elements 1, 2 and diodes 21, 22, as is well understood.

In the illustrated embodiment, the switching elements 1, 3, 5, and 7 comprise a first set of switches which are capable of commutating the current through the inductive element 110 ($i_L$) (indicated by arrow 190) from the node 138 to the node 137 when the current through the inductive element 110 is flowing in a negative direction (e.g., $i_L<0$), and the switching elements 2, 4, 6, and 8 comprise a second set of switches that are capable of commutating the current through the inductive element 110 from the node 137 to the node 138 when the current through the inductive element 110 is flowing in a positive direction (e.g., $i_L>0$). In other words, the switching elements 1, 3, 5, and 7 are capable of conducting at least a portion of current flowing in a negative direction through the inductive element 110, and the switching elements 2, 4, 6, and 8 are capable of conducting at least a portion of current flowing in a positive direction through the inductive element 110. As used herein, commutating should be understood as the process of cycling the current through the inductive element 110 through the switching elements and diodes of the second energy conversion module 108 such that the flow of current through the inductive element 110 is not interrupted.

In an exemplary embodiment, the isolation module 106 includes a first set of windings 126 connected between the nodes 124, 128 of the first energy conversion module 104 and a second set of windings 134 connected between the nodes 135, 136 of the second energy conversion module 108. The windings 126, 134 provide inductive elements that are magnetically coupled in a conventional manner to form a transformer. In an exemplary embodiment, the isolation module 106 is realized as a high-frequency transformer. In this regard, the isolation module 106 comprises a transformer designed for a particular power level at a high-frequency, such as the switching frequency of the switching elements of the energy conversion modules 104, 108 (e.g., 50 kHz), resulting in the physical size of the transformer being reduced relative to a transformer designed for the same power level at a lower frequency, such as the frequency of the AC energy source 156 (e.g., the mains frequency).

The inductive element 110 is realized as an inductor configured electrically in series between the node 137 of the second energy conversion module 108 and a node 192 of the AC interface 114. The inductive element 110 functions as a high-frequency inductive energy storage element during operation of the electrical system 100. The capacitive element 112 is realized as a capacitor coupled between the node 192 and another node 194 of the AC interface 114, that is, the capacitive element 112 is configured electrically parallel to the AC interface 114. The capacitive element 112 and the inductive element 110 are cooperatively configured to provide a high frequency filter to minimize voltage ripple at the AC interface 114 attributable to modulating the switching elements 1-8.

The interface shorting switch 115 is coupled across the nodes 192, 194. The control module 116 regulates the actuation of the interface shorting switch 115 such that the electrical system 100 operates in a normal mode when the interface shorting switch 115 is open (as depicted in FIG. 1). As described in more detail below, the interface shorting switch 115 is closed to place the electrical system into a discharge configuration for discharging the DC bus capacitor 103. It should be appreciated that the AC energy source 156 is disconnected before the interface shorting switch 115 is closed.

The control module 116 generally represents the hardware, firmware and/or software configured to operate and/or modulate the switching elements of the energy conversion modules 104, 108 as needed to achieve the desired power flow during normal operation of the electrical system 100, and to control the operation of the switching elements of the energy conversion modules 104, 108 as needed to facilitate discharging of the DC bus capacitor 103. Depending on the embodiment, the control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

During normal operation for grid-to-vehicle applications, the control module 116 determines PWM command signals that control the timing and duty cycles of the switching elements 1-8 of the second energy conversion module 108 to produce a high-frequency AC voltage across the windings 134 of the isolation module 106. The high-frequency AC voltage across the windings 134 induces a voltage across the windings 126 at the nodes 124, 128 that results in a desired current flowing to the DC interface 102 to charge or otherwise deliver energy to the DC energy source 154. In practice, the control module 116 controls the duty cycle of the switching elements 1-8 to implement the appropriate switching pattern during a switching interval (e.g., the inverse of the switching frequency). During the switching interval (or PWM cycle), the control module 116 alternates between operating the switching elements 1-8 to effectively short-circuit the nodes 137, 138 and cycle energy through the second energy conversion module 108 to apply a voltage across the inductive element 110 before operating the switching elements 1-8 to release the stored energy and/or voltage of the inductive element 110 (alternatively, the fly-back voltage). The sum of the fly-back voltage and the input voltage 180 at the AC interface 114 is applied to the windings 134 of the isolation module 106, resulting in a power transfer to the nodes 124, 128 and/or the DC energy source 154. In this manner, the control module 116 operates the switching elements 1-8 of the second energy conversion module 108 to alternate between cycling energy through the inductive element 110 and delivering energy to the DC interface 102.

It should be understood that FIG. 1 depicts a simplified representation of the electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner. Additionally, although the electrical system 100 is described herein in the context of a bidirectional matrix converter for a vehicle, the subject matter is not intended to be limited to vehicular and/or automotive applications, and the subject matter described herein may be implemented in other applications where an energy conversion module is utilized to transfer energy using switching elements.

The control module 116 may also include or cooperate with one or more sensors, detectors, or monitors (not shown) that enable the control module to detect certain conditions that are indicative of a need to discharge the DC bus capacitor 103. For example, the control module 116 may be suitably configured to monitor or sense the status of the connection between the DC energy source 154 and the DC interface 102 such that the electrical system 100 can be placed into a discharge configuration to at least partially discharge the DC bus capacitor 103 when the DC energy source 154 becomes disconnected. As another example, the control module 116 may be suitably configured to detect when the electrical system 100 itself is disconnected from the host vehicle (which may be necessary for maintenance) such that the electrical system 100 can be arranged into the discharge configuration.

In accordance with one exemplary operating methodology, the DC bus capacitor 103 is at least partially discharged in the following manner. Initially, the AC energy source 156 and the DC energy source 154 are disconnected from their respective interfaces 114, 102. For a typical vehicle application, the control module, the switching elements, and possibly other components of the electrical system 100 remain powered by a low voltage energy source (such as a 12 volt DC battery) even though the AC energy source 156 and the DC energy source 154 have been disconnected. In practice, the control module 116 could be used to verify that the energy sources 154, 156 have been removed before proceeding with the discharge procedure. After the energy sources 154, 156 have been disconnected, the control module 116 actuates (i.e., closes) the interface shorting switch 115 to electrically short the AC interface 114. As a result of closing the interface shorting switch 115, the inductive element 110 is effectively placed in series between the nodes 137, 138 (see FIG. 2).

After shorting the AC interface 114, the control module 116 operates the switching elements of the energy conversion modules 104, 108 in a regulated manner to at least partially discharge the DC bus capacitor 103 over a period of time. In this regard, the control module 116 may arrange the switching elements of the second energy conversion module 108 into a predetermined discharge configuration to establish an electrical current path from one terminal of the secondary winding 134 of the isolation module 106, through the inductive element 110, and to another terminal of the secondary winding 134, and modulate one or more of the switching elements of the first energy conversion module 104 to alternately charge and discharge current in the inductive element 110 (while maintaining the discharge configuration of the second energy conversion module 108).

Figure 2:
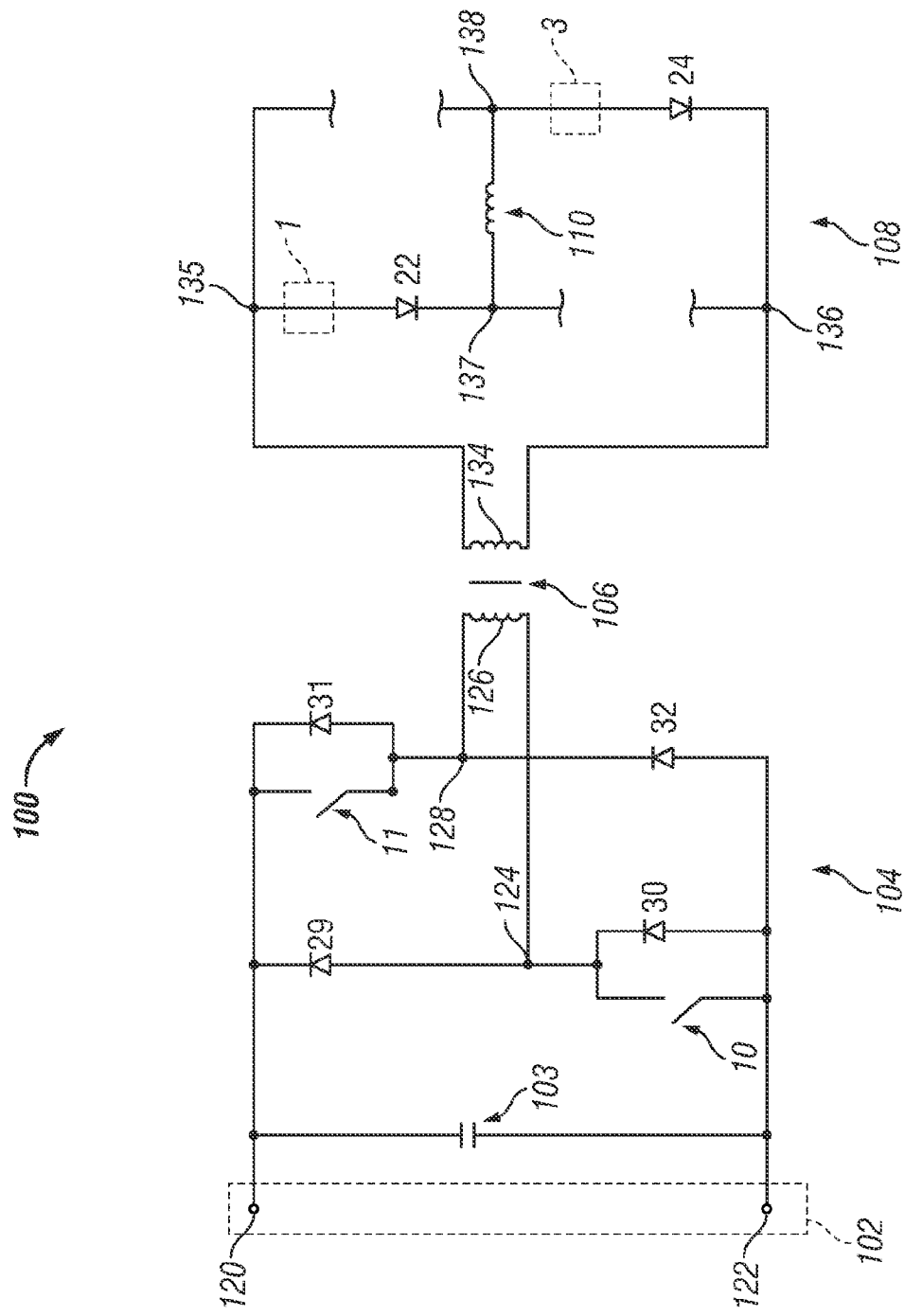
FIG. 2 is a schematic view of the electrical system shown in FIG. 1, when operating in a discharge configuration state.

The control module 116 operates the switching elements of the second energy conversion module 108 in the following manner to achieve the discharge configuration: the switching element 1 is closed and maintained in a closed position throughout the discharge procedure; the switching element 3 is closed and maintained in a closed position throughout the discharge procedure; and the switching elements 2, 4, 5, 6, 7, and 8 are opened and maintained in their opened positions throughout the discharge procedure. FIG. 2 depicts the state of the second energy conversion module 108 after its switching elements have been arranged into the desired discharge configuration. FIG. 2 has been simplified relative to FIG. 1 by removing any switch branches that represent open circuit conditions. Moreover, the interface shorting switch 115 is not separately shown in FIG. 2 because it effectively functions as a simple electrical conductor. Referring to FIG. 2, arranging the second energy conversion module 108 into its discharge configuration establishes an electrical current path that includes the secondary winding 134, the node 135, the switching element 1, the diode 22, the inductive element 110, the switching element 3, the diode 24, and the node 136.

To discharge the DC bus capacitor 103, the control module 116 operates the switching elements of the first energy conversion module 104 in the following manner: the switching element 9 is opened and maintained in an opened position throughout the discharge procedure; the switching element 12 is opened and maintained in an opened position throughout the discharge procedure; and the switching elements 10, 11 are modulated at a switching frequency to alternately charge and discharge current in the inductive element 110. For this particular embodiment, the switching elements 10, 11 are opened and closed in tandem at a fixed nominal switching frequency (e.g., 50 kHz). Thus, the control module 116 alternately configures the switching elements of the first energy conversion module 104 between a first state and a second state. The first state corresponds to the time during which the switching elements 10, 11 are closed, and the second state corresponds to the time during which the switching elements 10, 11 are open. FIG. 2 depicts the first energy conversion module 104 as configured in the second state.

In the first state, the first energy conversion module 104 establishes the voltage of the DC bus capacitor 103 across the primary winding 126 of the isolation module 106 (the closure of the switching elements 10, 11 connects the primary winding 126 electrically in parallel with the DC bus capacitor 103). In this first state, current flowing through the primary winding 126 induces a current in the secondary winding 134, which results in current building in the inductive element 110. In the first state, the voltage is established across the primary winding 126 for a controlled, preset, or otherwise designated period of time or duration, as regulated by the control module 116.

After charging the inductive element 110 in the above manner for the designated period of time (dictated by the switching frequency associated with the first energy conversion module 104), the control module 116 opens the switching elements 10, 11 to obtain the second state shown in FIG. 2. The switching frequency is selected to avoid saturating the inductive element 110. This effectively "resets" the inductive element 110 and allows the inductive element 110 to discharge back into the DC bus capacitor 103. In the second state, the first energy conversion module 104 charges the DC bus capacitor 103 with the primary winding 126 of the isolation module 106. During this second state, the inductive element 110 maintains current flow in the same direction through the current loop of the second energy conversion module 108. This maintained current induces a current in the primary winding 126, which flows through the diode 29 and the diode 32 to charge the DC bus capacitor 103. In the second state the DC bus capacitor is charged for a controlled, preset, or otherwise designated period of time or duration, as regulated by the control module 116. In practice, this duration of time is equal to the duration of time associated with the first state.

Figure 3:
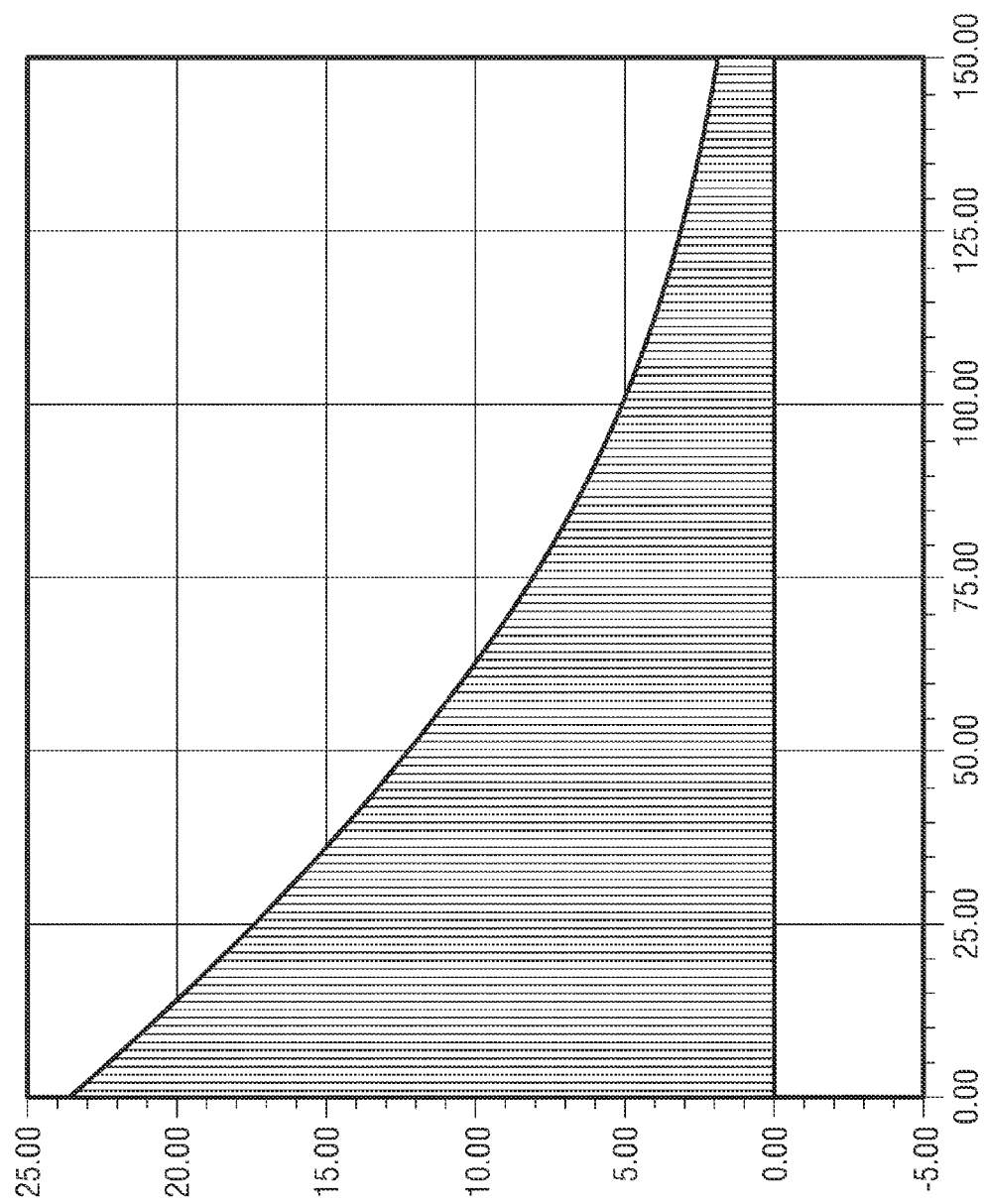
FIG. 3 is a representative plot of inductor current versus time for the inductance element in the electrical system shown in FIG. 1.
Figure 4:
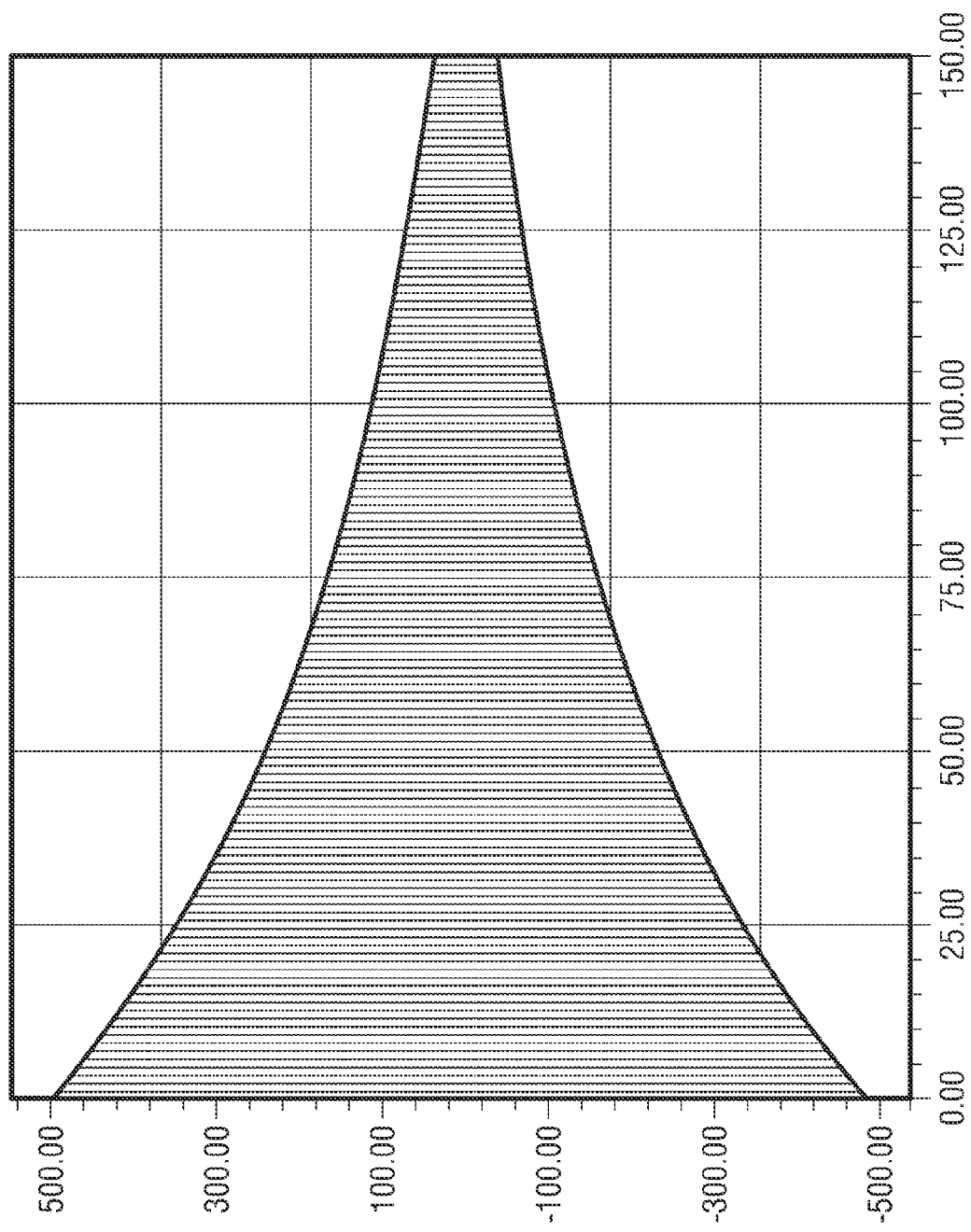
FIG. 4 is a representative plot of inductor voltage versus time for the inductance element in the electrical system shown in FIG. 1.

FIG. 3 is a representative plot of inductor current versus time for the inductive element 110 during a typical discharge operation. This plot depicts how the inductor current decays from a peak of about 24 amps to approximately two amps over a period of about 150 milliseconds. FIG. 4 is a representative plot of inductor voltage versus time for the inductive element 110 during a typical discharge operation. This plot depicts how the inductor voltage oscillates between positive and negative values (which results from the uniform direction current flowing through the inductive element 110), and how the inductor voltage quickly decays from a peak absolute value of almost 500 volts to an absolute value of about 50 volts over the same 150 millisecond period of time. These two plots illustrate how the DC bus capacitor 103 can be discharged quickly and effectively by modulating the switching elements 10, 11 while maintaining the discharge configuration of the second energy conversion module 108.

FIG. 5 is a graph that includes representative plots of inductor voltage 202 and inductor current 204 for the inductive element 110 during two typical discharge cycles. In contrast to that depicted in FIG. 3 and FIG. 4, however, FIG. 5 shows a much shorter period of time. Consequently, the overall decay characteristics shown in FIG. 3 and FIG. 4 are not distinguishable in FIG. 5. The inductor voltage 202 corresponds to the switching pattern of the switching elements 10, 11. Accordingly, the plot of the inductor voltage 202 resembles a square wave centered about zero volts. The plot of the inductor current 204 indicates how the inductive element 110 is charged with current while the switching elements 10, 11 are closed, and how the inductor current decreases while the switching elements 10, 11 are open.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system comprising:
   a direct current (DC) interface;
   an alternating current (AC) interface;
   a DC bus capacitor coupled electrically parallel to the DC interface;
   a first energy conversion module comprising a plurality of switching elements;
   a second energy conversion module comprising a plurality of switching elements;
   an isolation module coupled between the first energy conversion module and the second energy conversion module to provide galvanic isolation between the first energy conversion module and the second energy conversion module;

an inductive element coupled between the second energy conversion module and the AC interface;
an interface shorting switch coupled electrically parallel to the AC interface to selectively short the AC interface; and
a control module coupled to the first energy conversion module, the second energy conversion module, and the interface shorting switch, the control module configured to:
  detect a condition indicative of a need to discharge the DC bus capacitor;
  actuate the interface shorting switch to electrically short the AC interface; and
  operate the plurality of switching elements of the first energy conversion module and the plurality of switching elements of the second energy conversion module to at least partially discharge the DC bus capacitor.

2. The electrical system of claim 1, wherein the control module operates the plurality of switching elements of the second energy conversion module to establish an electrical current path that includes the inductive element.

3. The electrical system of claim 2, wherein the electrical current path includes a secondary winding of the isolation module.

4. The electrical system of claim 3, wherein the control module modulates the plurality of switching elements of the first energy conversion module at a switching frequency to alternately charge and discharge current in the inductive element.

5. The electrical system of claim 1, wherein:
  the control module alternately configures the plurality of switching elements of the first energy conversion module in a first state and a second state;
  in the first state, the first energy conversion module establishes a voltage of the DC bus capacitor across a primary winding of the isolation module for a first controlled period of time; and
  in the second state, the first energy conversion module charges the DC bus capacitor with the primary winding of the isolation module for a second controlled period of time that is equal to the first controlled period of time.

6. The electrical system of claim 1, wherein the second energy conversion module comprises:
  a first node coupled to a first terminal of the isolation module;
  a second node coupled to a second terminal of the isolation module;
  a third node and a fourth node, the inductive element coupled in series between the third node and the fourth node;
  a first switching element coupled between the first node and a fifth node;
  a second switching element coupled between the fifth node and the third node;
  a third switching element coupled between the fourth node and a sixth node;
  a fourth switching element coupled between the sixth node and the second node;
  a fifth switching element coupled between the second node and a seventh node;
  a sixth switching element coupled between the third node and the seventh node;
  a seventh switching element coupled between the fourth node and an eighth node; and
  an eighth switching element coupled between the first node and the eighth node, wherein the control module closes the first switching element and the third switching element, and opens the second switching element, the fourth switching element, the fifth switching element, the sixth switching element, the seventh switching element, and the eighth switching element to at least partially discharge the DC bus capacitor.

7. The electrical system of claim 6, wherein the second energy conversion module comprises:
  a first diode having its anode coupled to the fifth node and its cathode coupled to the first node;
  a second diode having its anode coupled to the fifth node and its cathode coupled to the third node;
  a third diode having its anode coupled to the sixth node and its cathode coupled to the fourth node;
  a fourth diode having its anode coupled to the sixth node and its cathode coupled to the second node;
  a fifth diode having its anode coupled to the seventh node and its cathode coupled to the second node;
  a sixth diode having its anode coupled to the seventh node and its cathode coupled to the third node;
  a seventh diode having its anode coupled to the eighth node and its cathode coupled to the fourth node; and
  an eighth diode having its anode coupled to the eighth node and its cathode coupled to the first node.

8. The electrical system of claim 1, wherein the first energy conversion module comprises:
  a ninth node coupled to a third terminal of the isolation module;
  a tenth node coupled to a fourth terminal of the isolation module;
  an eleventh node and a twelfth node, the DC bus capacitor coupled across the eleventh node and the twelfth node;
  a ninth switching element coupled between the tenth node and the eleventh node;
  a tenth switching element coupled between the tenth node and the twelfth node;
  an eleventh switching element coupled between the ninth node and the eleventh node; and
  a twelfth switching element coupled between the ninth node and the twelfth node, wherein the control module opens the ninth switching element and the twelfth switching element, and concurrently opens and closes the tenth switching element and the eleventh switching element to at least partially discharge the DC bus capacitor.

9. The electrical system of claim 8, wherein the first energy conversion module comprises:
  a ninth diode having its anode coupled to the tenth node and its cathode coupled to the eleventh node;
  a tenth diode having its anode coupled to the twelfth node and its cathode coupled to the tenth node;
  an eleventh diode having its anode coupled to the ninth node and its cathode coupled to the eleventh node; and
  a twelfth diode having its anode coupled to the twelfth node and its cathode coupled to the ninth node.

10. A method of operating an electrical system comprising a direct current (DC) interface, an alternating current (AC) interface, a DC bus capacitor coupled electrically parallel to the DC interface, a first energy conversion module comprising a plurality of switching elements, a second energy conversion module comprising a plurality of switching elements, an isolation module coupled between the first energy conversion module and the second energy conversion module to provide galvanic isolation between the first energy conversion module and the second energy conversion module, and an inductive element coupled between the second energy conversion module and the AC interface, the method comprising:

detecting a condition indicative of a need to discharge the DC bus capacitor;

electrically shorting the AC interface;

arranging the plurality of switching elements of the second energy conversion module into a discharge configuration to establish an electrical current path from a first terminal of the isolation module, through the inductive element, and to a second terminal of the isolation module; and modulating one or more of the plurality of switching elements of the first energy conversion module to alternately charge and discharge current in the inductive element, while maintaining the discharge configuration of the plurality of switching elements of the second energy conversion module.

11. The method of claim 10, further comprising disconnecting the DC interface from its DC energy source.

12. The method of claim 10, wherein electrically shorting the AC interface comprises actuating an interface shorting switch coupled across the AC interface.

13. The method of claim 10, modulating the one or more of the plurality of switching elements is performed at a fixed frequency.

14. The method of claim 10, wherein:

modulating the one or more of the plurality of switching elements of the first energy conversion module alternately arranges the plurality of switching elements of the first energy conversion module in a first state and a second state;

in the first state, the first energy conversion module establishes a voltage of the DC bus capacitor across a primary winding of the isolation module for a first controlled period of time; and in the second state, the first energy conversion module charges the DC bus capacitor with the primary winding of the isolation module for a second controlled period of time that is equal to the first controlled period of time.

15. The method of claim 10, wherein detecting the condition comprises sensing disconnection of a high voltage battery from the DC interface.

16. A method of discharging a bus capacitor of a bidirectional matrix converter of a vehicle having a direct current (DC) energy source, the bidirectional matrix converter comprising a DC interface for the DC energy source, an alternating current (AC) interface for an AC energy source to charge the DC energy source via the bidirectional matrix converter, a first energy conversion module, a second energy conversion module, an isolation module coupled between the first energy conversion module and the second energy conversion module, and an inductive element coupled between the second energy conversion module and the AC interface, the method comprising:

electrically shorting the AC interface after the AC energy source is disconnected from the AC interface;

arranging a plurality of switching elements of the second energy conversion module into a discharge configuration to establish an electrical current path from a first terminal of the isolation module, through the inductive element, and to a second terminal of the isolation module; and modulating a plurality of switching elements of the first energy conversion module, while maintaining the discharge configuration of the second energy conversion module, to at least partially discharge the DC bus capacitor.

17. The method of claim 16, further comprising:

detecting a condition indicative of a need to discharge the DC bus capacitor; and verifying disconnection of the AC energy source before electrically shorting the AC interface.

18. The method of claim 16, further comprising:

detecting a condition indicative of a need to discharge the DC bus capacitor; and verifying disconnection of the DC energy source before electrically shorting the AC interface.

19. The method of claim 16, wherein modulating the plurality of switching elements of the first energy conversion module alternately charges and discharges current in the inductive element.

20. The method of claim 19, wherein:

modulating the plurality of switching elements of the first energy conversion module alternately arranges the plurality of switching elements of the first energy conversion module in a first state and a second state;

in the first state, the first energy conversion module establishes a voltage of the DC bus capacitor across a primary winding of the isolation module for a first controlled period of time; and in the second state, the first energy conversion module charges the DC bus capacitor with the primary winding of the isolation module for a second controlled period of time that is equal to the first controlled period of time.

* * * * *